United States Patent
Tamaki

(10) Patent No.: US 8,860,873 B2
(45) Date of Patent: Oct. 14, 2014

(54) FOCUS DETECTION APPARATUS AND IMAGE PICKUP APPARATUS

(75) Inventor: Yoshihito Tamaki, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 49 days.

(21) Appl. No.: 13/810,091

(22) PCT Filed: Jul. 29, 2011

(86) PCT No.: PCT/JP2011/067914
§ 371 (c)(1),
(2), (4) Date: Jan. 14, 2013

(87) PCT Pub. No.: WO2012/018101
PCT Pub. Date: Feb. 9, 2012

(65) Prior Publication Data
US 2013/0120643 A1 May 16, 2013

(30) Foreign Application Priority Data
Aug. 3, 2010 (JP) ................. 2010-174458

(51) Int. Cl.
*H04N 5/232* (2006.01)
*G03B 13/00* (2006.01)
*G03B 13/36* (2006.01)
*G02B 7/28* (2006.01)
*H04N 5/217* (2011.01)
*H04N 5/369* (2011.01)

(52) U.S. Cl.
CPC ............ *H04N 5/23212* (2013.01); *G03B 13/36* (2013.01); *G02B 7/28* (2013.01); *H04N 5/217* (2013.01); *H04N 5/3696* (2013.01)
USPC .......................................... 348/350; 348/347

(58) Field of Classification Search
CPC H04N 5/23212; H04N 5/2356; H04N 5/3696
USPC ........... 348/49, 207.99, 222.1, 340, 345–357; 396/9–83, 88–152; 250/201.4, 201.6, 250/201.7; 352/139, 140; 359/696, 698; 382/255
See application file for complete search history.

(56) References Cited

U.S. PATENT DOCUMENTS

2013/0010086 A1* 1/2013 Iwasaki ........................... 348/49

FOREIGN PATENT DOCUMENTS

| JP | 4-267211 A | 9/1992 |
|----|-----------|--------|
| JP | 5-127074 A | 5/1993 |
| JP | 2009-180778 A | 8/2009 |

* cited by examiner

*Primary Examiner* — Dennis Hogue
(74) *Attorney, Agent, or Firm* — Fitzpatrick, Cella, Harper & Scinto

(57) ABSTRACT

The focus detection apparatus includes an image pickup part 107 including first and second pupil division pixels $S_{HA}$ and $S_{HB}$ to produce first and second image signals, a processor 121 performing a restoration process on the first and second image signals to produce first and second restored image signals, and a calculating part calculating a provisional value of a defocus amount of an image-forming optical system by using the first and second image signals. When the provisional value is smaller than a predetermined value, the restoration process is performed to produce pluralities of the first and second restored image signals by using a greater number of image restoration filters than when the provisional value is greater than the predetermined value, and the defocus amount is calculated by using the pluralities of the first and second image signals.

4 Claims, 13 Drawing Sheets

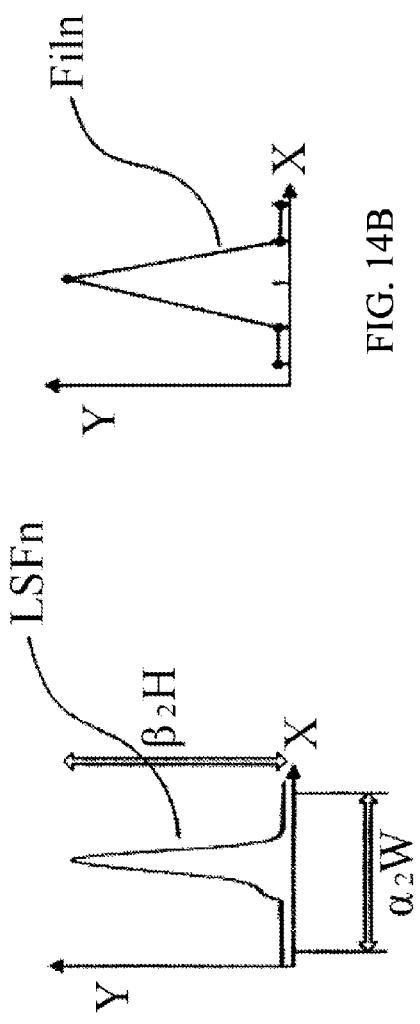
FIG. 14A
FIG. 14B
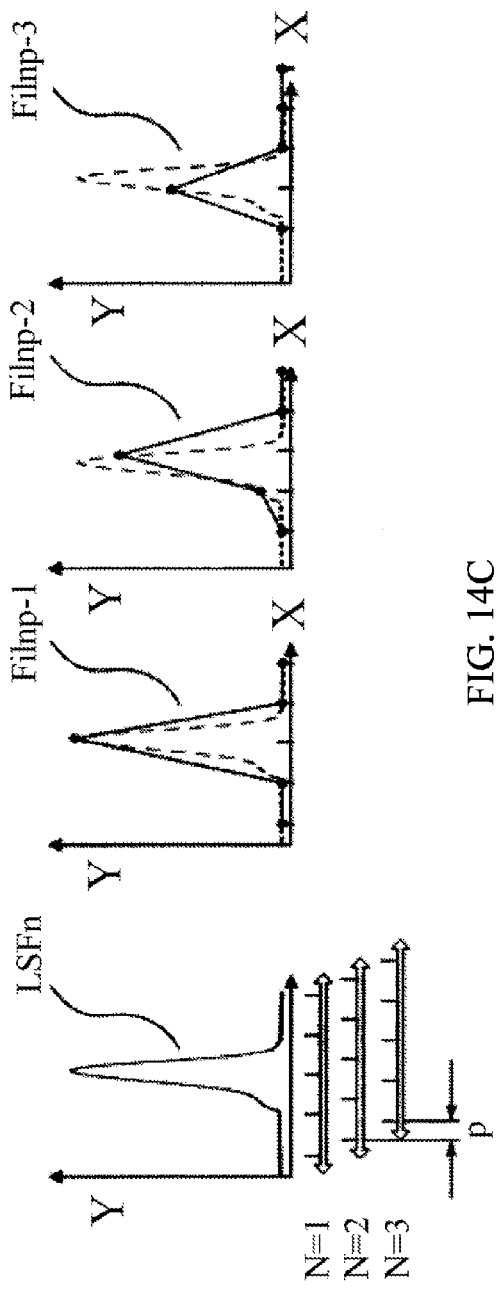
FIG. 14C

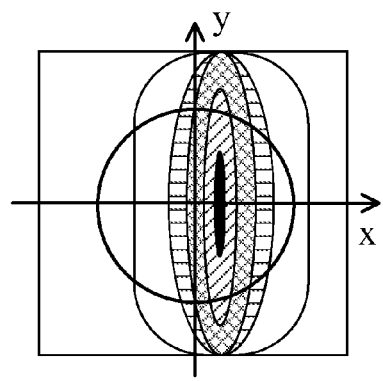
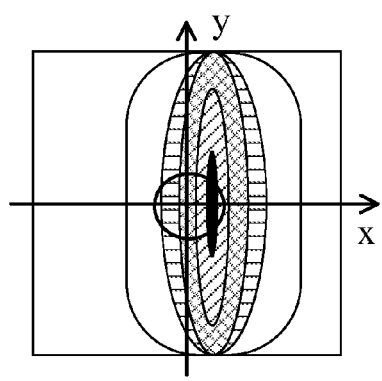
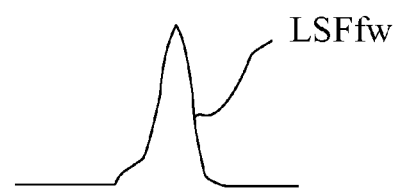
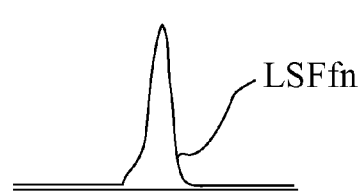
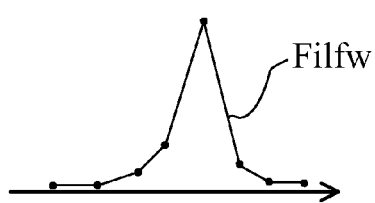
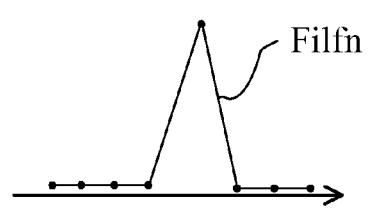
FIG. 15A  FIG. 15B

FOCUS DETECTION APPARATUS AND IMAGE PICKUP APPARATUS

TECHNICAL FIELD

The present invention relates to a focus detection apparatus that detects a focus state of an image-forming optical system using an output signal from an image sensor capable of photoelectrically converting an optical image formed by the image-forming optical system, and to an image pickup apparatus provided therewith such as a digital camera.

BACKGROUND ART

Regarding focus detection apparatuses for detecting a focus state of an image-forming optical system, Japanese Patent Laid-Open No. 4-267211 discloses an apparatus that performs so-called pupil division focus detection using a two-dimensional image sensor (image pickup element) having a micro-lens formed in each of two-dimensionally arranged pixels. In the image pickup element used in the apparatus disclosed in Japanese Patent Laid-Open No. 4-267211, the micro-lens and a photoelectric converting part in each pixel are relatively displaced. An image pickup apparatus provided with this focus detection apparatus adds signals from the pixels whose relative displacement directions of the micro-lens and the photoelectric converting part are mutually different to produce a normal captured image. On the other hand, the image pickup apparatus performs correlation calculation on paired image signals produced by pixels groups whose relative displacement directions of the micro-lens and the photoelectric converting part are mutually different to obtain a phase difference between the paired image signals, and calculates a defocus amount of an image-forming optical system (image-taking optical system) on the basis of the phase difference.

Moreover, vignetting of light fluxes forming paired optical images to be used for the focus detection, which is caused by a light-blocking member such as an optical element holding member that holds an optical element constituting part of the image-forming optical system, causes asymmetry in each of paired image signals corresponding to the paired optical images (that is, decrease of a degree of coincidence between the paired image signals). Japanese Patent Laid-Open No. 5-127074 discloses a focus detection apparatus that transforms a specific image restoration filter stored in an image pickup apparatus according to an aperture ratio of an image-forming optical system, an exit pupil position thereof or a phase difference amount, and applies the transformed image restoration filter to image signals, thereby performing focus detection with high accuracy. The application of the image restoration filter is performed by convolution of the image signals with the image restoration filter, so that a pitch of the image restoration filter coincides with that of the image signal.

However, the focus detection apparatus disclosed in Japanese Patent Laid-Open No. 5-127074 fixes the pitch of the image restoration filter and a number of the image restoration filters applied to the image signal regardless of the defocus amount and an aperture value of the imaging-forming optical system. Thus, the focus detection apparatus cannot perform accurate image restoration due to aliasing distortion in a near-in-focus state where a filter length becomes long, which deteriorates focus detection accuracy.

SUMMARY OF INVENTION

The present invention provides a focus detection apparatus capable of reducing influence of the aliasing distortion of the image restoration filter and thereby performing focus detection with high accuracy, and an image pickup apparatus including the same.

The present invention provides as one aspect thereof a focus detection apparatus including an image pickup part configured to include first pixels photoelectrically converting a first image formed by a light flux passing through a first pupil area of an image-forming optical system to produce a first image signal and second pixels photoelectrically converting a second image formed by a light flux passing through a second pupil area of the image-forming optical system to produce a second image signal, a filter generator configured to produce an image restoration filter to be used for a restoration process for the first image signal and the second image signals, an image restoration processor configured to respectively perform the restoration process on the first image signal and the second image signal by using the image restoration filter to produce a first restored image signal and a second restored image signal, and a calculating part configured to calculate a defocus amount of the image-forming optical system by using the first and second restored image signals. The calculating part is configured to calculate a provisional value of the defocus amount by using the first and second image signals. The apparatus is characterized in that, for a case where the provisional value is smaller than a predetermined value, the filter generator is configured to produce a greater number of the image restoration filters than for a case where the provisional value is greater than the predetermined value, the image restoration processor is configured to perform the restoration process on the first image signal and the second image signal by respectively using the greater number of the image restoration filters to produce a plurality of the first restored image signals and a plurality of the second restored image signals, and the calculating part is configured to calculate the defocus amount by using the pluralities of the first and second image signals.

The present invention provides as another aspect thereof an image pickup apparatus including the above-described focus detection apparatus, and an image generator configured to produce an image based on an output signal from the image pickup part.

The present invention provides as still another aspect thereof a focus detection method using an image pickup part configured to include first pixels photoelectrically converting a first image formed by a light flux passing through a first pupil area of an image-forming optical system to produce a first image signal and second pixels photoelectrically converting a second image formed by a light flux passing through a second pupil area of the image-forming optical system to produce a second image signal. The method includes a filter generating step of producing an image restoration filter to be used for a restoration process for the first image signal and the second image signals, an image restoration step of performing the restoration process on the first image signal and the second image signal by respectively using the image restoration filter to produce a first restored image signal and a second restored image signal, and a calculating step of calculating a defocus amount of the image-forming optical system by using the first and second restored image signals. In the calculating step, a provisional value of the defocus amount is calculated by using the first and second image signals. The method is characterized in that, for a case where the provisional value is smaller than a predetermined value, in the filter generating step, a greater number of the image restoration filters is produced than for a case where the provisional value is greater than the predetermined value, in the image restoration step, the image restoration process is performed on the first image signal and the second image signal by respectively using the greater number of the image restoration filters to produce a plurality of the first image signals and a plurality of the second image signals, and in the calculating step, the defocus amount is calculated by using the pluralities of the first and second image signals.

Further features and aspects of the present invention will become apparent from the following description of exemplary examples with reference to the attached drawings.

BRIEF DESCRIPTION OF DRAWINGS

FIGS. 14A, 14B and 14C show processes to obtain the image restoration filter from the line spread function in a slight defocus state in Example 1.

FIGS. 15A and 15B show processes to obtain image restoration filters from line spread functions according to respective aperture values in Example 2 of the present invention.

DESCRIPTION OF EMBODIMENTS

Exemplary examples of the present invention will hereinafter be described with reference to the accompanying drawings.

Example 1

Figure 1:
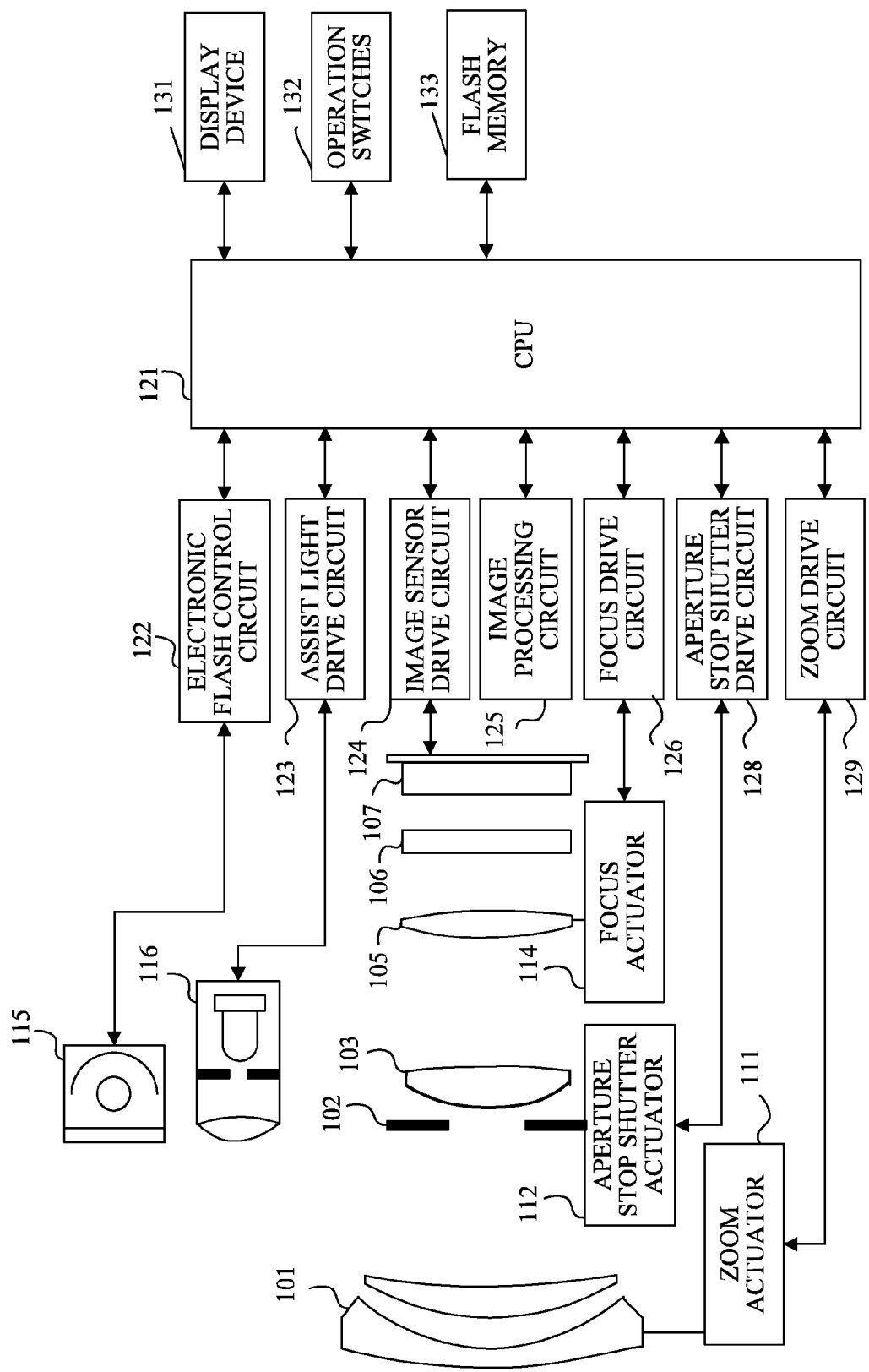
FIG. 1 is a block diagram showing the configuration of an image pickup apparatus that is Example 1 of the present invention.

FIG. 1 shows the configuration of a digital camera (image pickup apparatus) including a focus detection apparatus that is a first example (Example 1) of the present invention. In FIG. 1, reference numeral 101 denotes a first lens group placed closest to an object in an image-taking optical system (image-forming optical system). The first lens group 101 is movable in a direction of an optical axis (hereinafter referred to as an "optical axis direction"). Reference numeral 102 denotes an aperture stop shutter having a stop function of varying its aperture diameter (aperture value) to adjust a light quantity and a shutter function of opening and closing its aperture to control an exposure time when capturing a still image.

Reference numeral 103 denotes a second lens group. The aperture stop shutter 102 is moved integrally with the second lens group 103 in the optical axis direction. The movement of the first and second lens groups 101 and 102 in the optical axis direction performs variation of magnification (zooming).

Reference numeral 105 denotes a third lens group that is moved in the optical axis direction to perform focusing. Reference numeral 106 denotes an optical low-pass filter that is an optical element to reduce false color and moire in a captured image. Reference numeral 107 denotes an image sensor (image pickup element) constituted by a CMOS sensor and its peripheral circuit. The image sensor 107 has m pixels (light-receiving elements) in a horizontal direction and n pixels in a vertical direction, and primary color mosaic filters are arranged for the pixels in a Bayer arrangement, thereby constituting a two-dimensional single color sensor.

Reference numeral 111 denotes a zoom actuator that rotates a cam barrel (not shown) about the optical axis to move the first and second lens groups 101 and 102 in the optical axis direction for the variation of magnification.

Reference numeral 112 denotes an aperture stop shutter actuator that drives the aperture stop shutter 102 to vary the aperture diameter for light quantity adjustment and performs shutter drive for still image capturing. Reference numeral 114 denotes a focus actuator that moves the third lens group 105 in the optical axis direction for focusing.

Reference numeral 115 denotes an electronic flash including a xenon tube or an LED as a light source. Reference numeral 116 denotes an AF-assist light emitter that projects a mask image including a certain pattern onto the object through a projection lens. The projection of the mask image onto the object can improve AF performance when the object is dark or has a low contrast.

Reference numeral 121 denotes a camera CPU as a controller that governs control of various operations in the camera. The camera CPU 121 includes a computing part, a ROM, a RAM, an A/D converter, a D/A converter and a communication interface circuit. The camera CPU 121 controls the operation of each part in the camera according to computer programs stored in the ROM, and causes a series of image-capturing operations such as AF including focus detection (detection of a focus state) of the image-taking optical system, image capturing, image processing and recording. The camera CPU 121 corresponds to a calculating part.

Reference numeral 122 denotes an electronic flash control circuit that controls lighting of the electronic flash 115. Reference numeral 123 denotes an assist light drive circuit that controls lighting of the AF-assist light emitter 116. Reference numeral 124 denotes an image sensor drive circuit that drives the image sensor 107, A/D-converts pixel signals (image pickup signals) output from the image sensor 107, and transmits the converted digital image pickup signals to the camera CPU 121. Reference numeral 125 denotes an image processing circuit that performs various image processing on the digital image pickup signals such as γ conversion and color interpolation to produce an image signal, and performs other processes on the image signal such as JPEG compression.

Reference numeral 126 denotes a focus drive circuit that drives the focus actuator 114 on the basis of a focus detection result to move the third lens group 105 in the optical axis direction so as to obtain an in-focus state. Reference numeral 128 denotes an aperture stop shutter drive circuit that drives the aperture stop shutter actuator 112. Reference numeral 129 denotes a zoom drive circuit that drives the zoom actuator 111 in response to a user's zoom operation.

Reference numeral 131 denotes a display device such as an LCD that displays information on an image-capturing mode of the camera, a preview image before image capturing, a captured image for confirmation and an in-focus state obtained by the AF. Reference numeral 132 denotes operation switches including a power switch, a release switch (image-capturing trigger switch), a zoom operation switch and an image-capturing mode selection switch. Reference numeral 133 denotes a detachable flash memory that records captured images.

Next, description will be made of the structure of an image pickup pixel and a focus detection pixel arranged on the image sensor 107 with reference to FIGS. 2A, 2B, 3A and 3B. The image sensor 107 in this example employs the Bayer arrangement in which 4(=2×2) pixels that include two pixels having a spectral sensitivity to G (green) and being located at two diagonal places and two pixels respectively having spectral sensitivities to R (red) and B (blue) and being located at other two places. The focus detection pixels are dispersedly placed in the image pickup pixels arranged in the Bayer arrangement.

Figure 2A:
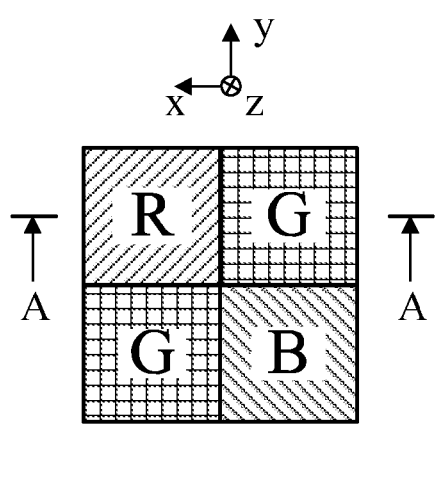
FIGS. 2A and 2B are a front view and a cross-sectional view of image pickup pixels in an image sensor provided in the image pickup apparatus of Example 1.
Figure 2B:
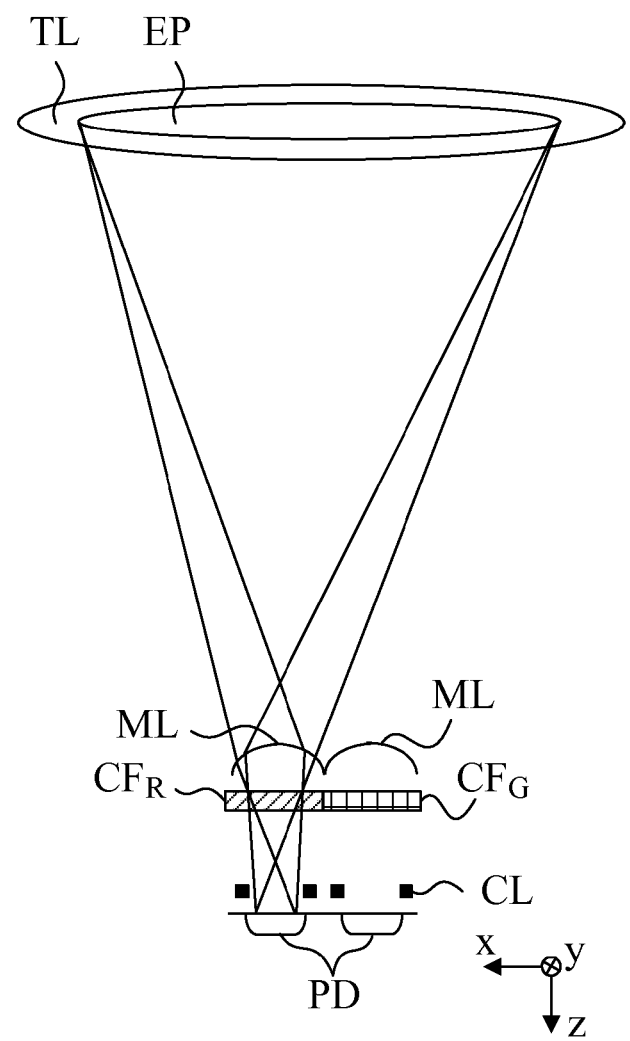

FIGS. 2A and 2B respectively show a front view and a cross-sectional view of 2×2 image pickup pixels located at a center of the image sensor 107. As described above, the two G-pixels are arranged at the two diagonal places and the R- and B-pixels are arranged at the other two diagonal places.

FIG. 2B shows a cross section cut along a line A-A in FIG. 2A. Reference character ML denotes an on-chip micro-lens placed at a most-front layer of each pixel. Reference character $CF_R$ denotes an R (red)-color filter, and reference character $CF_G$ denotes a G (green)-color filter. Reference character PD denotes the photoelectric conversion part of the CMOS sensor described using FIG. 3. Reference character CL denotes a wiring layer in which signal lines to transmit various signals in the CMOS sensor are formed. Reference character TL denotes the image-taking optical system.

The on-chip micro-lens ML and the photoelectric conversion part PD of the image pickup pixel are configured so as to take in a light flux that has passed through the image-taking optical system TL as effectively as possible. In other words, an exit pupil EP of the image-taking optical system TL and the photoelectric conversion part PD are arranged in a conjugate relationship by the micro-lens ML, and a large effective area of the photoelectric conversion part PD is set. Although FIG. 2B shows the structure of the R-pixel, the G- and B (Blue)-pixel have the same structure. Therefore, the exit pupil EP corresponding to the RGB image pickup pixels has a large diameter in order to efficiently take in the light flux from the object, which improves the S/N ratio of the image signal.

Figure 3A:
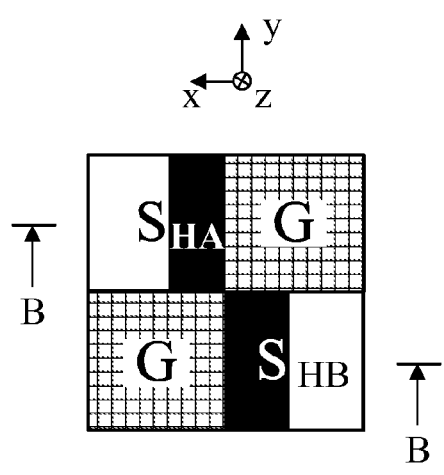
FIGS. 3A and 3B are a front view and a cross-sectional view of focus detection pixels in the image sensor.
Figure 3B:
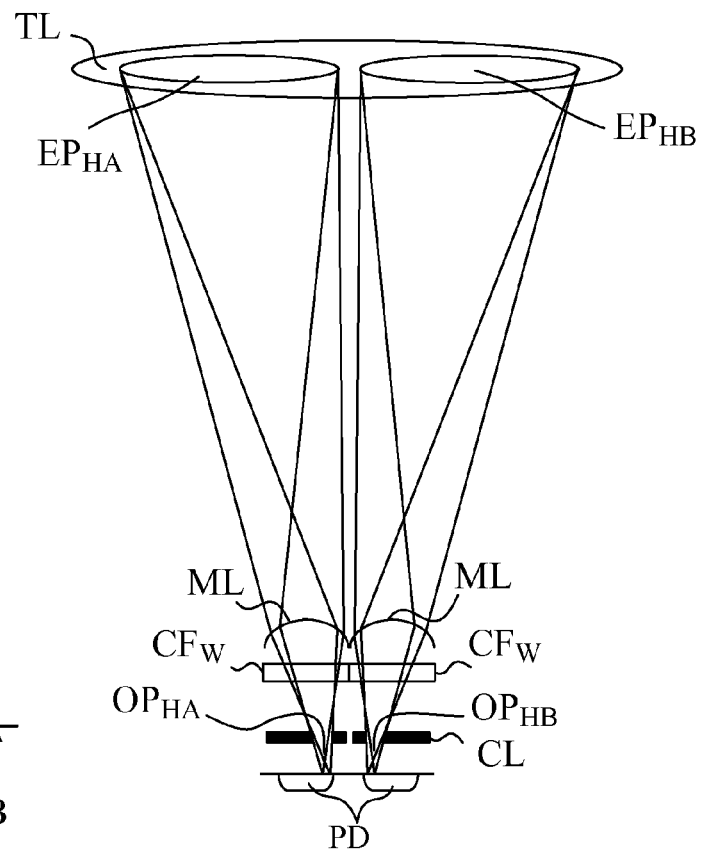

FIGS. 3A and 3B respectively show a front view and a cross-sectional view of 2×2 pixels including focus detection pixels, the 2×2 pixels being located at the center of the image sensor 107 and the focus detection pixels dividing a pupil of the image-taking optical system TL in an x-direction as a pupil division direction.

In the image pickup signal, an output from the G-pixel is a main component of luminance information. Since a human image recognition characteristic is sensitive to the luminance information, defect of the G-pixel easily causes humans to recognize image quality degradation. On the other hand, though the R- and B pixels provide color information, the humans are insensitive to the color information, and therefore defect of the R- and B pixels hardly causes the humans to recognize the image quality degradation. Thus, this example leaves, in the 4 (=2×2) pixels, two G-pixels as the image pickup pixels, and places the focus detection pixels at positions for the R- and B-pixels at a certain rate. FIG. 3A shows the focus detection pixels by $S_{HA}$ and $S_{HB}$.

A plurality of the focus detection pixels $S_{HA}$ dispersedly arranged on the image sensor 107 corresponds to "first pixels" or "a first pixel group", and a plurality of the focus detection pixels $S_{HB}$ dispersedly arranged thereon corresponds to "second pixels" or a "second pixel group".

FIG. 3B shows a cross section cut along a line B-B in FIG. 3A. The micro-lens ML and the photoelectric conversion part PD have same structures as those in the image pickup pixel shown in FIG. 2B.

In this example, since signals from the focus detection pixels are not used for producing a captured image, a transparent film (white film) $CF_W$ is placed instead of a color separation color filter.

Moreover, since the focus detection pixel divides the pupil in a +x-direction, an aperture of the wiring layer CL is displaced with respect to a centerline of the micro-lens ML in the x-direction. Specifically, since an aperture $OP_{HA}$ of the focus detection pixel $S_{HA}$ is displaced in a -x-direction, and thus the photoelectric conversion part PD of the focus detection pixel $S_{HA}$ receives a light flux passing through a left side (+x side) exit pupil area (first pupil area) $EP_{HA}$ of the image-taking optical system TL. On the other hand, since an aperture $OP_{HB}$ of the focus detection pixel $S_{HB}$ is displaced in a +x-direction, and thus the photoelectric conversion part PD of the focus detection pixel $S_{HB}$ receives a light flux passing through a right side (−x side) exit pupil area (second pupil area) $EP_{HB}$ of the image-taking optical system TL.

An object image obtained by the plural focus detection pixels $S_{HA}$ (first pixels) regularly arranged in the x-direction is referred to an A-image (first image). Moreover, an object image obtained by the plural focus detection pixels $S_{HB}$ (second pixels) regularly arranged in the x-direction is referred to a B-image (second image). Detecting a relative positional relationship (that is, a phase difference) between the A- and B-images enables calculation of a defocus amount of the image-taking optical system TL for the object on the basis of the phase difference.

Figure 4:
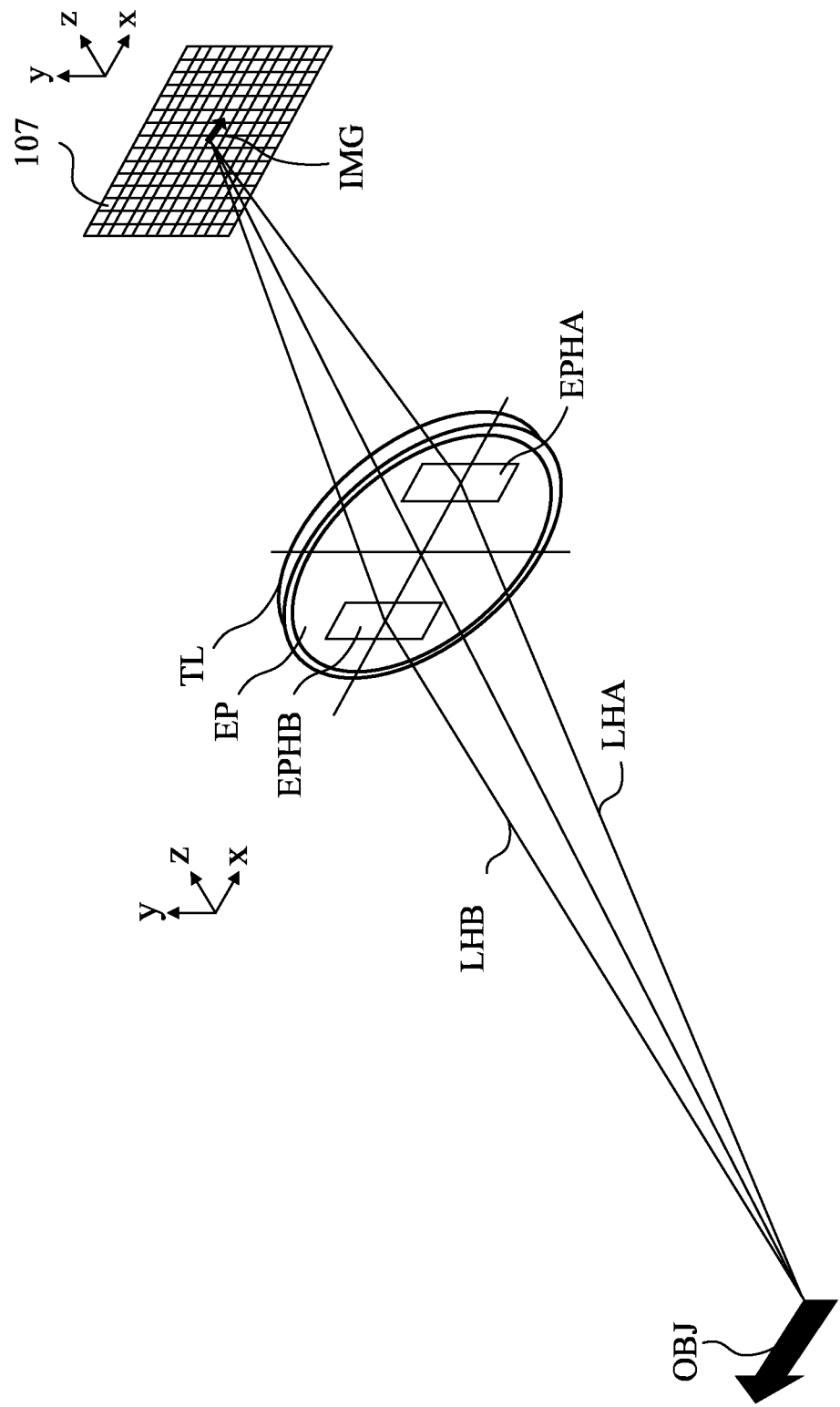
FIG. 4 shows pupil division by the image sensor.

FIG. 4 shows pupil division by the image sensor 107 in this example. Reference character TL denotes the image-taking optical system, reference numeral 107 denotes the image sensor, reference character OBJ denotes an object, and reference character IMG denotes an object image.

The image pickup pixel receives the light flux that has passed through the entire area of the exit pupil EP of the image-taking optical system TL as shown in FIG. 2B. On the other hand, the focus detection pixel $S_{HA}$ shown in FIG. 3A receives the light flux that has passed through the +x side pupil area $EP_{HA}$ of the exit pupil EP. Similarly, the focus detection pixel $S_{HB}$ receives the light flux that has passed through the exit pupil area $EP_{HB}$. Dispersedly arranging the focus detection pixels over the entire area of the image sensor 107 enables the focus detection over the entire effective image pickup area.

Although the focus detection pixels $S_{HA}$ and $S_{HB}$ are capable of performing the focus detection for an object having a luminance distribution in the x-direction of an image-capturing frame, such as a line extending in a y-direction, they are incapable of performing the focus detection for an object having a luminance distribution in the y-direction, such as a line extending in the x-direction. Thus, although not shown, this example is also provided with focus detection pixels dividing the pupil in the y-direction of the image-taking optical system TL in order to be capable of also performing the focus detection for the latter object.

Next, description will be made of a pupil intensity distribution and a line spread function when vignetting of the light fluxes forming the A- and B-images (hereinafter also referred to as "image forming light flux"). The pupil intensity distribution means an intensity distribution of the light flux in an exit pupil surface.

Figure 5A:
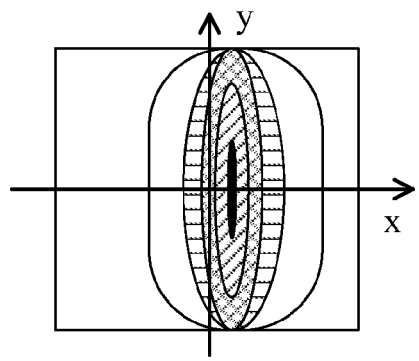
FIGS. 5A, 5B and 5C show pupil intensity distributions and line spread function of the focus detection pixel in Example 1.
Figure 5B:
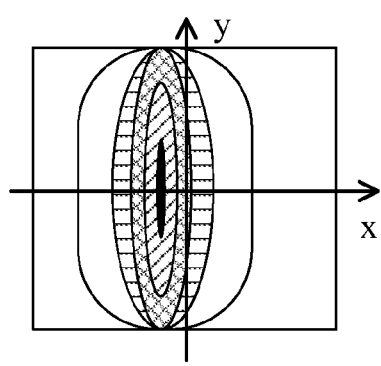
Figure 5C:
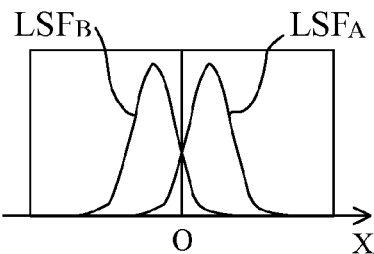

FIGS. 5A, 5B and 5C show the pupil intensity distributions of the focus detection pixels and the line spread function obtained from the pupil intensity distributions. FIG. 5A shows the pupil intensity distribution of the focus detection pixel $S_{HA}$, and FIG. 5B shows the pupil intensity distribution of the focus detection pixel $S_{HB}$. An x-axis and a y-axis in FIGS. 5A and 5B respectively correspond to the x-axis and the y-axis in FIG. 4. In FIGS. 5A and 5B, a darker color indicates a higher light-receiving intensity. FIG. 3A has showed the exit pupil area $EP_{HA}$ through which the light flux received by the focus detection pixel $S_{HA}$ passes and the exit pupil area $EP_{HB}$ through which the light flux received by the focus detection pixel $S_{HB}$ passes, separately from each other. However, in reality as shown in FIGS. 5A and 5B, the exit pupil areas through which the light fluxes received by the focus detection pixels $S_{HA}$ and $S_{HB}$ pass partially overlap each other because of blurring and spreading due to an influence of diffraction caused by the apertures $OP_{HA}$ and $OP_{HB}$.

FIG. 5C shows the line spread functions $LSF_A$ and $LSF_B$ of the focus detection pixels $S_{HA}$ and $S_{HB}$. The line spread functions $LSF_A$ and $LSF_B$ in this figure correspond to y-direction projection results of the pupil intensity distributions shown in FIGS. 5A and 5B. A horizontal axis corresponds to the x-axis in FIGS. 5A and 5B, and a vertical axis shows intensity of the line spread function. An origin O corresponds to a position of the optical axis of the image-taking optical system.

A point spread function, that is, an intensity distribution of a point image formed on an image-forming surface by a light flux that has been emitted from a point light source and has passed through an exit pupil of an image-forming optical system, can be considered to be a reduced projection result of a pupil intensity distribution having a shape of the exit pupil, when the image-forming optical system has no aberration. Thus, since a line spread function is a projection result of the point spread function, a projection result of the pupil intensity distribution is the line spread function. As shown in FIG. 5C, in the focus detection pixels located at the center of the image sensor, the line spread functions $LSF_A$ and $LSF_B$ respectively corresponding to the A- and B-images are approximately symmetric with each other with respect to the optical axis. In other words, shapes of the point images corresponding to the line spread functions $LSF_A$ and $LSF_B$ approximately coincide with each other. Moreover, each of the line spread functions $LSF_A$ and $LSF_B$ has an approximately symmetric shape in the x-direction with respect to its centroid position as a symmetry center in the x-direction.

Figure 6A:
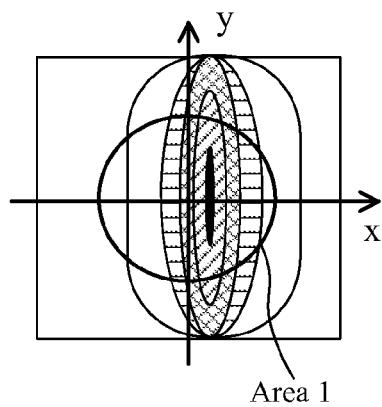
FIGS. 6A, 6B and 6C show pupil intensity distributions and line spread function of a central focus detection pixel in the image sensor.
Figure 6B:
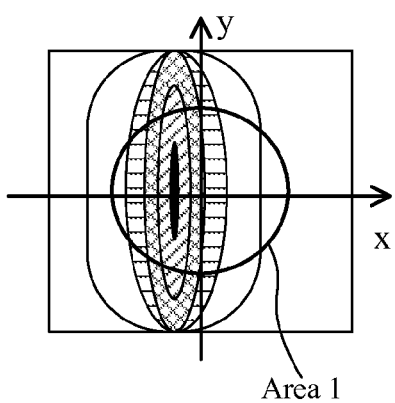
Figure 6C:
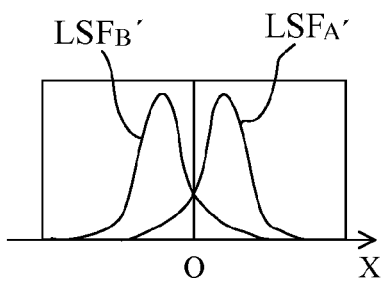

Next, description will be made of the pupil intensity distribution and the line spread function when the vignetting of the image-forming light flux is caused. FIGS. 6A and 6B show the pupil intensity distributions when the vignetting of the image-forming light fluxes is caused, with respect to the pupil intensity distributions shown in FIGS. 5A and 5B, by an optical element holding member (hereinafter referred to as a "lens holding member") that holds an optical element such as a lens constituting a part of the image-forming optical system. FIG. 6C shows the line spread functions obtained from these pupil intensity distributions. FIG. 6A shows the pupil intensity distribution of the focus detection pixel $S_{HA}$, and FIG. 6B shows the pupil intensity distribution of the focus detection pixel $S_{HB}$. In the pupil intensity distributions of the focus detection pixels $S_{HA}$ and $S_{HB}$, only areas inside shapes shown by Areal correspond to light flux areas to be received by the focus detection pixels $S_{HA}$ and $S_{HB}$.

FIG. 6C shows the line spread functions $LSF_A'$ and $LSF_B'$ of the focus detection pixels $S_{HA}$ and $S_{HB}$ when the vignetting is caused. The line spread functions $LSF_A'$ and $LSF_B'$ shown in FIG. 6C correspond to y-direction projection results of the pupil intensity distributions shown in FIGS. 6A and 6B, as well as in FIG. 5C. A horizontal axis corresponds to the x-axis in FIGS. 6A and 6B, and a vertical axis shows intensity of the line spread function. An origin O corresponds to the optical axis position of the image-taking optical system.

As shown in FIG. 6C, in the focus detection pixels located at the center of the image sensor, the line spread functions $LSF_A'$ and $LSF_B'$ respectively corresponding to the A- and B-images are approximately symmetric with each other with respect to the optical axis, as well as the line spread functions $LSF_A$ and $LSF_B$ shown in FIG. 5C. However, as shown in FIGS. 6A and 6B, the pupil intensity distributions are partially clipped by the area Areal, and therefore each of the line spread functions $LSF_A'$ and $LSF_B'$ has an asymmetric shape in the x-direction with respect to its centroid position in the x-direction.

Figure 7:
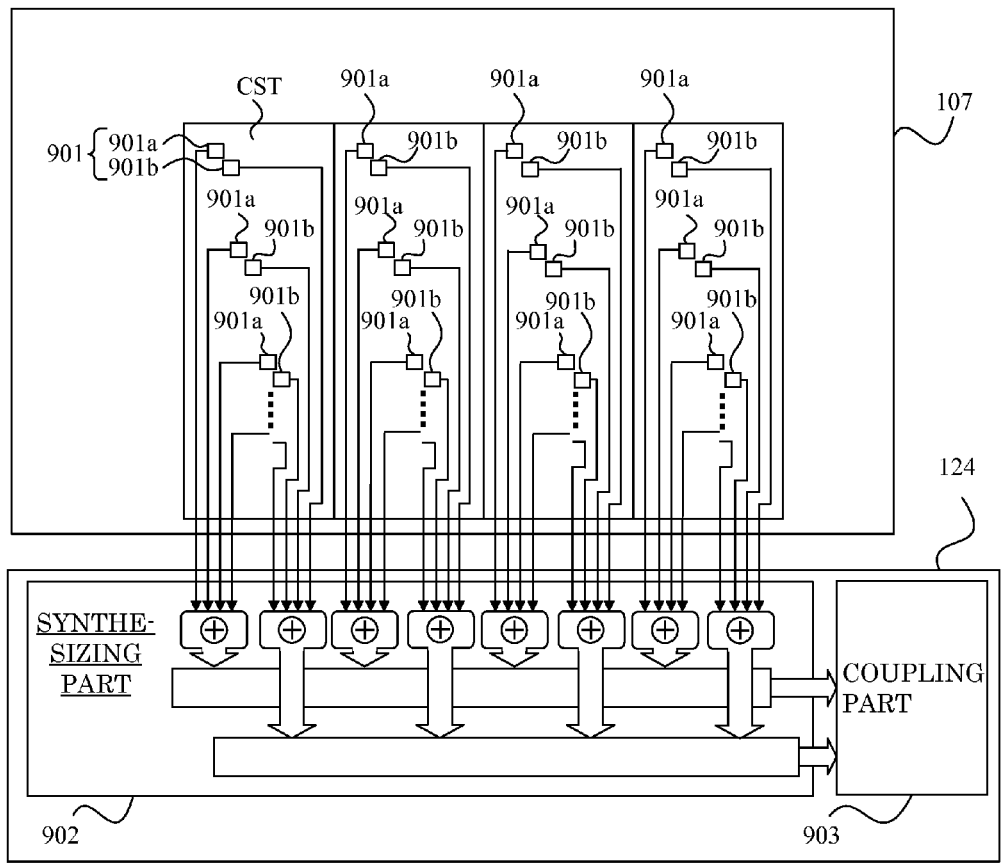
FIG. 7 is a circuit diagram showing the configuration of the image sensor

FIG. 7 shows the configuration of the image sensor 107 and the image sensor drive circuit 124 shown in FIG. 1 for the focus detection. In FIG. 7, the A/D converter is omitted.

The image sensor 107 includes plural focus detection pixel pairs 901 each constituting a focus detection pixel 901a corresponding to the focus detection pixel $S_{HA}$ shown in FIG. 3A and a focus detection pixel 901b corresponding to the focus detection pixel $S_{HB}$ shown in the same figure. Moreover, the image sensor 107 includes plural image-pickup pixels for photoelectrically converting an object image formed by the image-taking optical system.

The image sensor drive circuit 124 includes a synthesizing part 902 and a coupling part 903. Moreover, the image sensor drive circuit 124 divides an image-pickup surface of the image sensor 107 into plural sections (areas) CST such that each section CTS includes two or more of the plural focus detection pixel pairs 901. The image sensor drive circuit 124 can arbitrarily change a size, arrangement and a number of the sections CTS.

The synthesizing part 902 performs, in each divided section CST of the image sensor 107, a process to synthesize output signals from the focus detection pixels 901a to produce a first synthesized signal corresponding to one pixel signal. Moreover, the synthesizing part 902 performs, in each divided section CST, a process to synthesize output signals from the focus detection pixels 901b to produce a second synthesized signal corresponding to one pixel signal.

The coupling part 903 performs a process to couple the first synthesized signals produced in the plural sections CST to produce a first image signal (first coupled signal) corresponding to an A-image signal, and performs a process to couple the second synthesized signals produced in the plural sections CST to produce a second image signal (second coupled signal) corresponding to a B-image signal. The first and second image signals are thus obtained which are produced by coupling the output signals from the focus detection pixels 901a and 901b provided in the respective sections CST.

The camera CPU 121 performs correlation calculation on the first and second image signals to calculate a phase difference therebetween, and calculates a defocus amount of the image-taking optical system on the basis of the phase difference. Thus, synthesis of the output signals from the focus detection pixels provided in each section CST for the pupil division in a same direction enables sufficiently good detection of a luminance distribution of an object even if a luminance at each focus detection pixel pair 901 is low.

Figure 8:
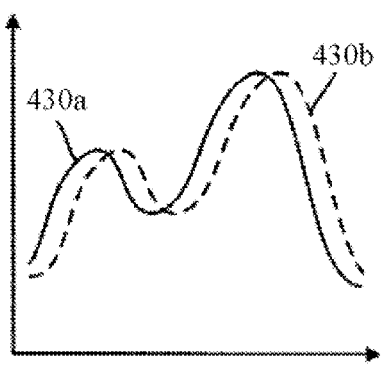
FIG. 8 shows image signals obtained from the focus detection pixels.

Next, description will be made of the image signal output from the image sensor 107. FIG. 8 shows the first image signal 430*a* and the second image signal 430*b* produced by the coupling part 903 shown in FIG. 7. In FIG. 8, a horizontal axis shows an arrangement direction of the focus detection pixels whose output signals are coupled, and a vertical axis shows intensity of the image signal.

In a defocus state of the image-taking optical system, the first image signal 430*a* and the second image signal 430*b* are relatively displaced to the right and left, respectively. Calculation of the phase difference that is a displacement amount of these first and second image signals 430*a* and 430*b* by the correlation calculation enables calculation of the defocus amount of the image-taking optical system from the phase difference.

In this example, as shown in FIG. 6C, each line spread function is asymmetric with respect to its centroid due to the vignetting of the image-forming light flux, so that each of the first and second image signals also has asymmetry. That is, a degree of coincidence between the first and second image signals (A- and B-images) is decreased. The decrease of the degree of coincidence between the image signals (that is, asymmetry of each image signal) in the focus detection by a phase difference detection method used in this example makes accurate calculation of the defocus amount impossible. Thus, this example corrects the asymmetry of the image signal to solve this problem.

Description will be made of a reason of generation of the asymmetry in the image signal and the correction of the asymmetry.

When a light quantity distribution of the object is represented by f(x, y), and a light quantity distribution of the image signal is represented by g(x, y), the following relationship using convolution is established:

$$g(x, y) = \int_{-\infty}^{\infty}\int_{-\infty}^{\infty} f(x-a, y-b)h(a, b)dadb \quad (1)$$

where h(a, b) represents a transfer function showing a state of deterioration of an object image caused in an image pickup system constituted by the image-taking optical system and an image producing system, which is referred to as a point spread function (PSF). It is necessary for knowing the state of paired object images (paired image signals) being used in the focus detection to know the point spread function. The focus detection by the phase difference detection method focuses on a one-dimensional direction of the paired image signals to detect the phase difference therebetween, which makes it possible to evaluate the image pickup system relating to the focus detection by using the line spread function that is a one-dimensional function, instead of the point spread function.

Thus, when the light quantity distribution of the object is represented by f(x) and the light quantity distribution of the image signal is represented by g(x), the expression (1) is rewritten as follows by using the line spread function L(a):

$$g(x) = \int_{-\infty}^{\infty} f(x-a)L(a)da. \quad (2)$$

Moreover, a relationship between the point spread function and the line spread function can be expressed by the following expression (3):

$$L(a) = \int_{-\infty}^{\infty} h(a, b)db. \quad (3)$$

As described above, the intensity distribution of the point image formed on the image-forming surface by the light flux that has been emitted from the point light source and has passed through the exit pupil of the optical system, that is, the point spread function, can be considered to be the reduced projection result of the pupil intensity distribution having the exit pupil shape when the optical system has no aberration. Therefore, the point spread function h(a, b) can be replaced by the pupil intensity distribution.

In addition, from the expression (3), the line spread function can be considered to be a projection of the pupil intensity distribution. Thus, in FIGS. 5A to 5C and 6A to 6C, description has been made of the line spread function being regarded as the projection of the pupil intensity distribution. Therefore, as shown by the expression (2), the paired object images (first and second images) in this example are convolved with the asymmetric line spread functions $LSF_A'$ and $LSF_B'$, which generates asymmetry in each of the first and second image signals.

As described above, the asymmetry in each of the paired image signals to be used for the correlation calculation decreases the focus detection accuracy. In order to improve the focus detection accuracy, correcting the asymmetry in each of the paired image signals to increase the degree of coincidence of the image signals is effective.

Next, description will be made of an image restoration process to correct the asymmetry of the image signal. In the following description, the image signal obtained from the output signals of the focus detection pixels 901*a* shown in FIG. 7 is referred to as an "image signal ImgA", and the image signal obtained from the output signals of the focus detection pixels 901*b* shown in FIG. 7 is referred to as an "image signal ImgB". The asymmetry in the image signals ImgA and ImgB is generated by convolution with asymmetric line spread functions $LSF_A''$ and $LSF_B''$.

FIGS. 9A to 9I show a filter process as the image restoration process. A horizontal axis in these figures shows a pixel arrangement direction, and a vertical axis shows intensity of the image signal.

Figure 9A:
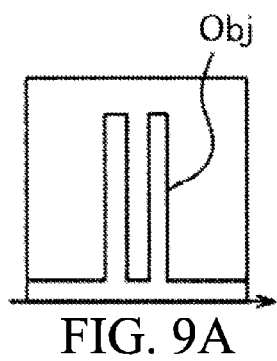
FIGS. 9A to 9I show an image restoration filter process in Example 1.
Figure 9B:
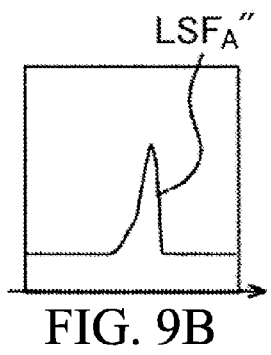
Figure 9C:
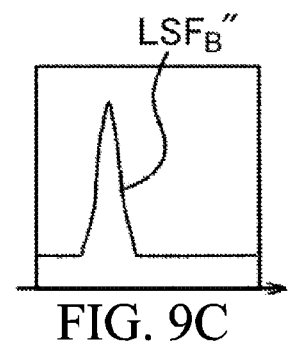
Figure 9D:
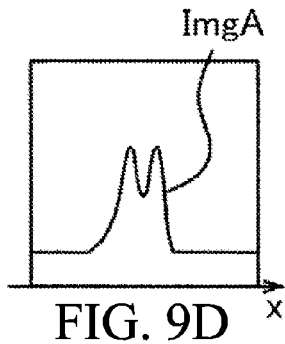
Figure 9E:
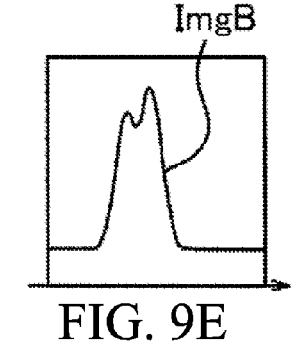

FIG. 9A shows the light quantity distribution of the object by Obj. FIGS. 9B and 9C show the line spread functions of the focus detection pixels $S_{HA}$ and $S_{HB}$ by $LSF_A''$ and $LSF_B''$. FIGS. 9D and 9E show the image signals ImgA and ImgB having shapes respectively formed by the convolution of the object light quantity distribution Obj with the line spread functions $LSF_A''$ and $LSF_B''$.

Figure 9F:
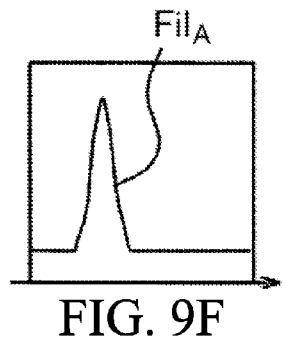
Figure 9G:
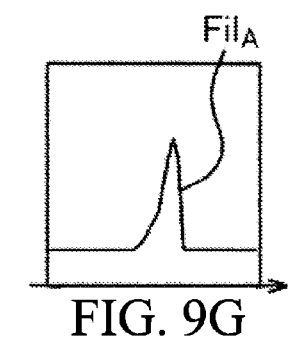
Figure 9H:
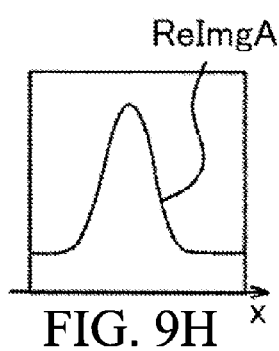
Figure 9I:
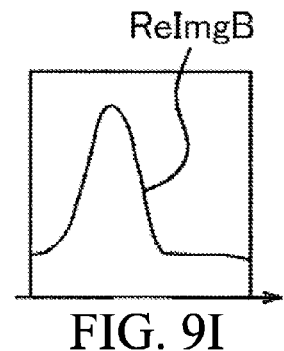

FIG. 9F shows an image restoration filter $Fil_A$ for the image signal ImgA. FIG. 9G shows an image restoration filter $Fil_B$ for the image signal ImgB. The image restoration filter $Fil_A$ for the image signal ImgA and the image restoration filter $Fil_B$ for the image signal ImgB are hereinafter respectively referred to as an "A-image restoration filter $Fil_A$" and a "B-image restoration filter $Fil_B$". FIG. 9H shows a restored image signal (first restored image signal) ReImgA obtained by convolution of the image signal ImgA with the A-image restoration filter $Fil_A$. FIG. 9I shows a restored image signal (second restored image signal) ReImgB obtained by convolution of the image signal ImgB with the B-image restoration filter $Fil_B$.

As understood from FIGS. 9H and 9I, the restored image signals ReImgA and ReImgB have mutually a same shape.

Description will be made of the principle on which the restored image signals ReImgA and ReImgB have mutually the same shape. The image signal ImgA is obtained by the expression (2). When the restored image ReImgA obtained by the convolution of the image signal ImgA with the A-image restoration filter $Fil_A$ is represented by k(x), k(x) is expressed as follows:

$$k(x) = \int_{-\infty}^{\infty} g(x-b)L_B(b)db \qquad (4)$$
$$= \int_{-\infty}^{\infty}\int_{-\infty}^{\infty} f(x-a-b)L_A(a)da L_B(b)db$$
$$= \int_{-\infty}^{\infty}\int_{-\infty}^{\infty} f(x-a-b)L_A(a)L_B(b)dadb.$$

Similarly, the restored image ReImgB (=k(x)) is expressed as follows:

$$k(x) = \int_{-\infty}^{\infty}\int_{-\infty}^{\infty} f(x-a-b)L_A(a)L_B(b)dadb. \qquad (5)$$

As understood from the above expressions (4) and (5), the restored image ReImgA and the restored image ReImgB are equal to each other (that is, have mutually a same shape). Performing the correlation calculation on the restored images ReImgA and ReImgB equal to each other enables acquisition of the phase difference between the restored images ReImgA and ReImgB.

Description will hereinafter be made of a focus detection process (focus detection method) performed by the camera CPU 121 with reference to a flowchart shown in FIG. 10. This process is executed according to a computer program stored in a ROM provided in the camera CPU 121. This also applies to another example, which will be described later. The camera CPU 121 serves as a filter generator, an image restoration processor and a calculating part. The focus detection process includes a filter generating step, an image restoration step and a calculating step.

At step S001, the camera CPU 121 obtains lens information including information on a vignetting state (vignetting information) of the image-taking optical system.

Next at step S002, the camera CPU 121 obtains a focus detection area selected by a user or automatically set by the camera CPU 121 as an area where the focus detection is performed in the effective image-pickup area of the image sensor 107. Then, the camera CPU 121 retrieves, from the ROM provided in the camera CPU 121, information on the pupil intensity distribution for each of the focus detection pixels included in the selected focus detection area. Then, the camera CPU 121 calculates the line spread functions corresponding to the A- and B-images by using the pupil intensity distribution information and the vignetting information obtained at step S001.

Next at step S003, the camera CPU 121 calculates centroids of the line spread functions corresponding to the A- and B-images obtained at step S002, and calculates a base length that is a distance between the centroids.

Next at step S004, the camera CPU 121 retrieves the pixel signals from the focus detection pixels included in the selected focus detection area obtained at step S002 to produce the image signals ImgA and ImgB.

Next at step S005, the camera CPU 121 predicts shading of the image signals ImgA and ImgB produced at step S004 from the lens information obtained at step S001 and the pupil intensity distribution information obtained at step S002 to perform shading correction on the image signals ImgA and ImgB.

Next at step S006, the camera CPU 121 performs dark correction on the image signals ImgA and ImgB by using a dark value stored in the ROM provided in the camera CPU 121.

Next at step S007, the camera CPU 121 performs the correlation calculation on the image signals ImgA and ImgB on which the dark correction has been performed at step S006 to obtain the phase difference between these image signals ImgA and ImgB. Then, the camera CPU 121 calculates a provisional value of the defocus amount (hereinafter referred to as a "provisional defocus amount") from the obtained phase difference and the base length calculated at step S003.

Next at step S008, the camera CPU 121 determines whether or not the provisional defocus amount calculated at step S007 is larger (or equal to or larger) than a predetermined value (threshold value). If the provisional defocus amount is smaller than the threshold value, the camera CPU 121 proceeds to step S009 to calculate a greater number (a plurality) of the image restoration filters than an initial setting number of the image restoration filters as a method for reducing aliasing distortion of the image restoration filter in a near-in-focus state. In other words, this example changes not only the shape of the image restoration filter, but also the number of the image restoration filters (hereinafter referred to as an "image restoration filter number") according to the provisional defocus amount. The initial setting number of the image restoration filters (hereinafter referred to as an "initial image restoration filter number") is set to one or more.

On the other hand, if the provisional defocus amount is larger (or equal to or larger) than the threshold value, the camera CPU 112 sets the image restoration filter number to be equal to the initial image restoration filter number, and then proceeds to step S010.

A reason for increasing the image restoration filter number when the provisional defocus amount is smaller than the threshold value is as follows. When the defocus amount is large, a filter length of the image restoration filter becomes long, and thereby the shape of the image restoration filter can be expressed accurately to some extent. Therefore, the image restoration process reduces the asymmetry of the image signal, which enables accurate calculation of the defocus amount.

On the other hand, when the defocus amount is small, the filter length becomes short, and thereby only changing the shape of the image restoration filter, as well as the case where the defocus amount is large, cannot suppress generation of the aliasing distortion of the image restoration filter. Therefore, using the image restoration filter having a same sampling pitch as that for the case where the defocus amount is large in the image restoration process deteriorates the asymmetry of the image signal due to influence of the aliasing distortion of the image restoration filter, which makes it impossible to accurately calculate the defocus amount.

Accordingly, it is necessary to increase the image restoration filter number when the defocus amount is small so as to virtually reduce the sampling pitch of the filter in order to reduce the influence of the aliasing distortion of the image restoration filter.

At step S009, the camera CPU 121 calculates the image restoration filter number according to the provisional defocus amount obtained at step S007. Then, the camera CPU 121 proceeds to step S010 to decide a use image restoration filter number that is a number of the image restoration filter(s) to be actually used. Specifically, the camera CPU 121 decides the image restoration filter number calculated at step S009 or the initial image restoration filter number as the use image restoration filter number.

At step S011, the camera CPU 121 calculates (produces) the image restoration filters whose number has been decided at step S010. Specifically, the camera CPU 121 first changes the shape of the line spread functions $LSF_A'$ and $LSF_B'$ calculated at step S002 according to the provisional defocus amount. Then, the camera CPU 121 calculates the image restoration filters $Fil_A$ and $Fil_B$ whose respective numbers have been decided at step S010.

At step S012, the camera CPU 121 respectively performs the convolution of the image signals ImgA and ImgB with the image restoration filters $Fil_A$ and $Fil_B$. This produces a same pair number of the restored image signals ReImgA and ReImgB as the use image restoration filter number (when the use image restoration filter number is plural, the pair number of the restored image signals ReImgA and ReImgB is also plural).

Next at step S013, the camera CPU 121 performs the correlation calculation on each of the plural pairs or the one pair of the restored images ReImgA and ReImgB produced at step S012 to calculate the phase difference between each of the plural pairs or the one pair of the restored images ReImgA and ReImgB. Then, the camera CPU 121 selects, out of the phase differences of the plural pairs of the restored image signals ReImgA and ReImgB or the phase difference of the one pair thereof, one phase difference that is determined to be most reliable by a predetermined algorithm. The camera CPU 121 calculates the defocus amount of the image-taking optical system, which is to be used for AF, from the selected phase difference and the base length obtained at step S003. Thus, a series of processes included in the focus detection process is ended.

Thereafter, the camera CPU 121 calculates a movement direction and a movement amount of the third lens group 105 to obtain an in-focus state on the basis of the defocus amount for AF calculated at step S013, and moves the third lens group 105 according to the calculation results. That is, the camera CPU 121 performs AF.

Next, description will be made of a method of calculation of the image restoration filter performed at step S011 with reference to FIGS. 11A, 11B, 12, 13A, 13B and 14A to 14C. First, description will be made of a method of decision of a width of the image restoration filter with reference to FIGS. 11A and 11B.

Figure 11A:
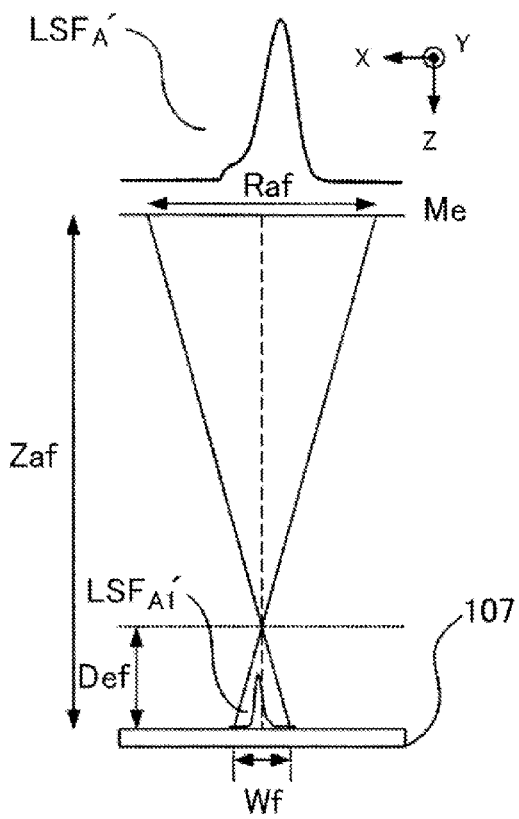
FIGS. 11A and 11B show light rays entering the image sensor in a defocus state in Example 1.
Figure 11B:
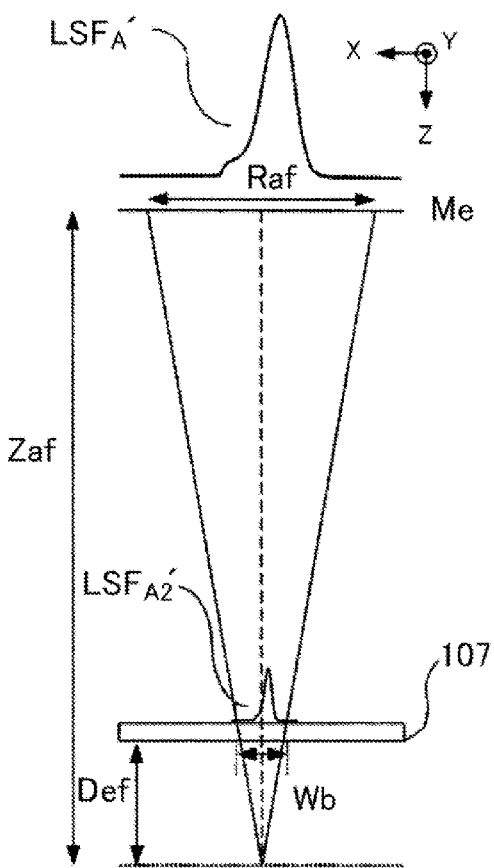

FIGS. 11A and 11B show light rays entering the image sensor 107 in the defocus state. FIG. 11A shows the light rays in a forward defocus state, and FIG. 11B shows the light rays in a backward defocus state. Zaf represents a distance from an image-pickup surface of the image sensor 107 to a pupil surface Me of the micro-lens ML, and Raf represents an x-direction width of the area Area1 shown in FIG. 6C. Def represents the defocus amount.

In the forward defocus state shown in FIG. 11A, the line spread function $LSF_A'$ has the width Raf on the pupil surface Me, and a line spread function $LSF_{A1}'$ on the image-pickup surface of the image sensor 107 has a reduced width Wf. In addition, the line spread function $LSF_{A1}'$ is inverted in the x-direction (right and left direction) with respect to the line spread function $LSF_A'$ in the forward defocus state. The width Wf is obtained, in consideration of the defocus amount being a negative value in the forward defocus state, by the following expression (6):

$$Wf = \left| \frac{Raf \times Def}{Zaf + Def} \right|. \quad (6)$$

The width Wf obtained by this expression (6) corresponds to the line spread function, that is, the width of the image restoration filter in the forward defocus state. Similarly, in the backward defocus state, a line spread function $LSF_{A2}'$ on the image-pickup surface of the image sensor 107 has a reduced width Wb. In this backward defocus state, the line spread function $LSF_{A2}'$ is not inverted in the right and left direction with respect to the line spread function $LSF_A'$. The width Wb of the line spread function $LSF_{A2}'$, that is, the width of the image restoration filter is also obtained by the expression (6). This also applies to the line spread function $LSF_B'$, and detailed description thereof is omitted.

Next, the intensity of the image restoration filter is adjusted to be constant by providing a gain. This is because of the shading correction performed on the image signals ImgA and ImgB at step S005. The adjustment of the intensities of the A- and B-image restoration filters is made such that no intensity difference between the restored image signals ReImgA and ReImgB may be caused. Then, at least one of waveforms of the A- and B-image restoration filters is moved so as to match the centroids thereof. This is to prevent the centroids of the restored image signals from being moved by the image restoration. The image restoration filters are calculated by such processes.

Next, description will be made of the change of the image restoration filter number according to the defocus amount (provisional defocus amount) with reference to FIGS. 12, 13A, 13B and 14A to 14C.

Figure 12:
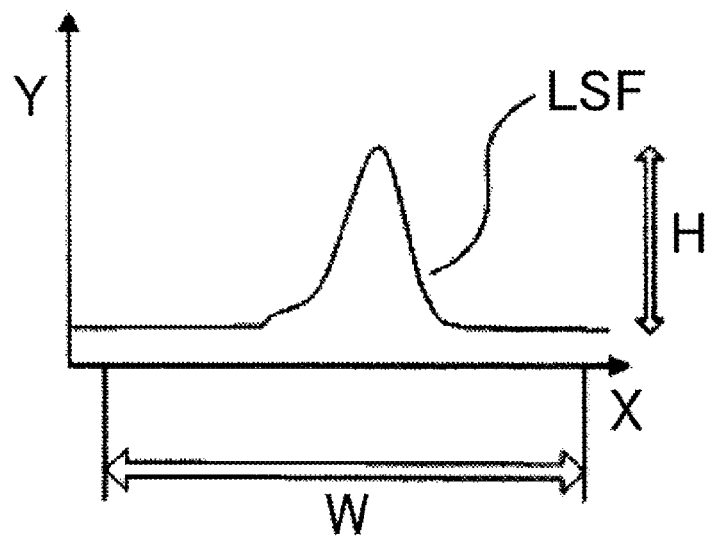
FIG. 12 shows a line spread function in Example 1.
Figure 13A:
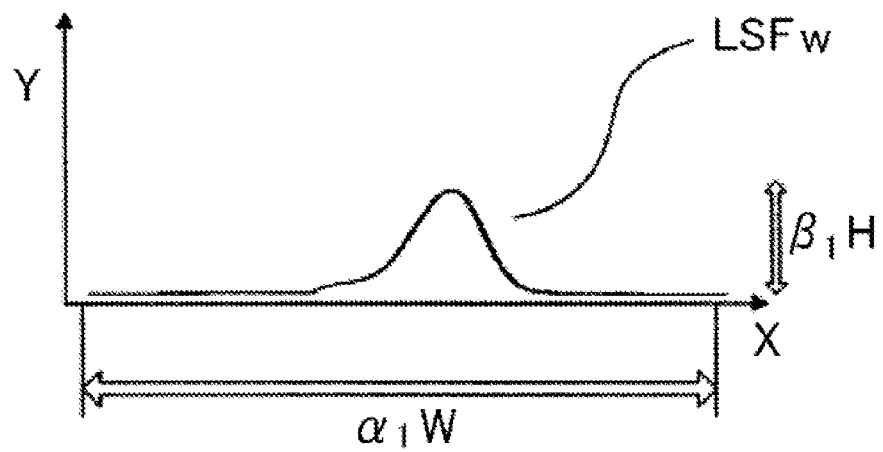
FIGS. 13A and 13B show processes to obtain the image restoration filter from the line spread function in a significant defocus state in Example 1.
Figure 13B:
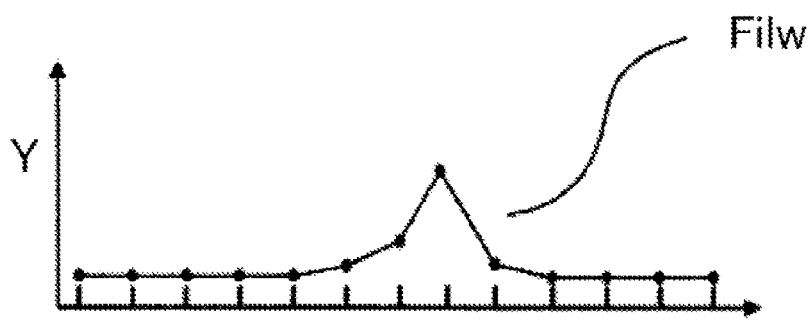

FIGS. 12, 13A, 13B and 14A to 14C show processes for producing the image restoration filter from the line spread function according to the defocus amount. FIG. 12 shows the line spread function LSF on the basis of which the image restoration filter is produced. In FIG. 12, W represents the width of the image restoration filter (filter width), and H represents the intensity of the image restoration filter (filter intensity). FIG. 13A shows a line spread function LSFw changed according to a large defocus amount, and FIG. 13B shows an image restoration filter Filw obtained by sampling the line spread function LSFw. FIG. 14A shows a line spread function LSFn changed according to a small defocus amount, and FIG. 14B shows an image restoration filter Filn obtained by sampling the line spread function LSFn. FIG. 14C shows image restoration filters Filnp-N (N=1, 2 and 3, for example) obtained by sampling the image restoration filter Filn an equal number of times to the image restoration filter number N (=3) with shifting a sampling start position by a pitch p for each sampling.

In a significant defocus (large defocus amount) state, as shown by the line spread function LSFw in FIG. 13A, the filter length is long, and the filter width is $\alpha_1 W$. Moreover, since the intensity is adjusted, a height of the filter is $\beta_1 H$. The image restoration filter Filw shown in FIG. 13B and obtained by sampling the line spread function LSFw can accurately express the shape of the line spread function LSFw to some extent.

On the other hand, in a slight defocus (small defocus amount) state, as shown by the line spread function LSFn in FIG. 14A, the filter length is short, and the filter width is $\alpha_2 W$. Moreover, since the intensity is adjusted, a height of the filter is $\beta_2 H$. Since the filter width $\alpha_2 W$ is very narrow with respect to the pitch of the image restoration filter, the image restoration filter Filn shown in FIG. 14B and obtained by sampling the line spread function LSFn cannot accurately express the shape of the line spread function LSFn. Thus, as shown in FIG. 14C, this example performs the sampling of the image restoration filter Filn N times with shifting the sampling start position by the pitch p for each sampling to calculate plural image restoration filters Filnp-N. Then, this example performs the image restoration by using the plural image restoration filters Filnp-N, and performs the correlation calculation to obtain the defocus amount of the image-taking optical system as described above.

Such virtual reduction of the filter pitch by using the plural image restoration filters enables reduction of the influence of the aliasing distortion of the image restoration filter.

As described above, this example changes the image restoration filter shape and the image restoration filter number according to the provisional defocus amount, thereby enabling production of the image restoration filters appropriate for calculation of the defocus amount, that is, the image restoration filters capable of reducing the influence of the aliasing distortion of the image restoration filter even in the near-in-focus state. This enables focus detection with higher accuracy.

This example has described the method of calculating the image restoration filters plural times with shifting the sampling start position, as an example of calculating plural image restoration filters. However, other methods than the above-described method may be used such as a method of preparing beforehand plural image restoration filters whose waveforms are mutually different. This also applies to another example, which will be described below.

Example 2

Next, description will be made of a second example (Example 2) of the present invention. This example is a modified version of Example 1. In this example, components common to those of Example 1 are denoted by same reference numerals as those in Example 1.

Example 1 has described the case where the image restoration filter number is changed according to the defocus amount (provisional value) of the image-taking optical system. On the other hand, this example changes the image restoration filter number according to an aperture value (F-number) of an aperture stop (aperture stop shutter 102) included in the image-taking optical system.

FIGS. 15A and 15B show processes to produce image restoration filters Filfw and Filfn from the line spread functions LSFfw and LSFfn according to the aperture value. Upper parts of FIGS. 15A and 15B show pupil intensity distributions when the vignetting of the image-forming light fluxes (due to the lens holding member) corresponding to the aperture value is caused on the pupil surface of the focus detection pixel located at the center of the image sensor 107. Moreover, middle parts of FIGS. 15A and 15B show the line spread functions LSFfw and LSFfn obtained from the pupil intensity distributions shown in the upper parts thereof, and lower parts of FIGS. 15A and 15B show the image restoration filters Filfw and Filfn obtained by sampling the line spread functions LSFfw and LSFfn.

When the aperture value is small (that is, the aperture diameter is large) as shown in FIG. 15A, the image restoration filter Filfw can express asymmetry of the line spread function LSFfw well. On the other hand, when the aperture value is large (that is, the aperture diameter is small) as shown in FIG. 15B, a line image is produced by a light flux passing through a more limited area of the pupil intensity distribution than when the aperture value is small.

When the aperture value is large as shown in FIG. 15B, a same sampling pitch as that for the small aperture value shown in FIG. 15A is too large. Therefore, the image restoration filter Filfn cannot correctly express the line spread function LSFfn, and causes the aliasing distortion thereof. Therefore, it is desirable to change the image restoration filter number according to the aperture value so as to reduce the influence of the aliasing distortion of the image restoration filter.

Figure 16:
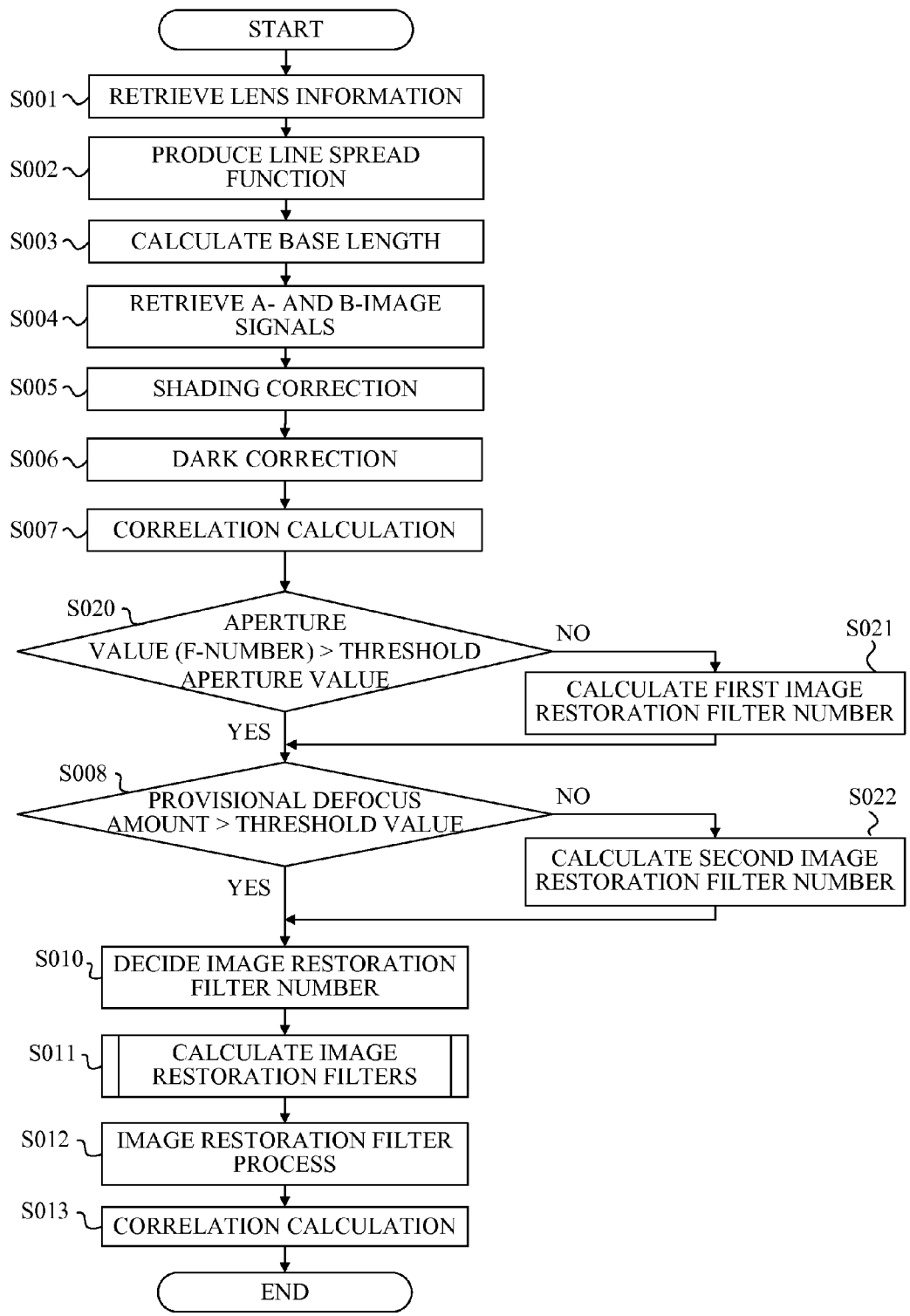
FIG. 16 is a flowchart showing a focus detection process in which a number of image restoration filters is changed according to the aperture value and an defocus amount in Example 2.

FIG. 16 is a flowchart showing a focus detection process (focus detection method) performed by a camera CPU 121 in this example.

Figure 10:
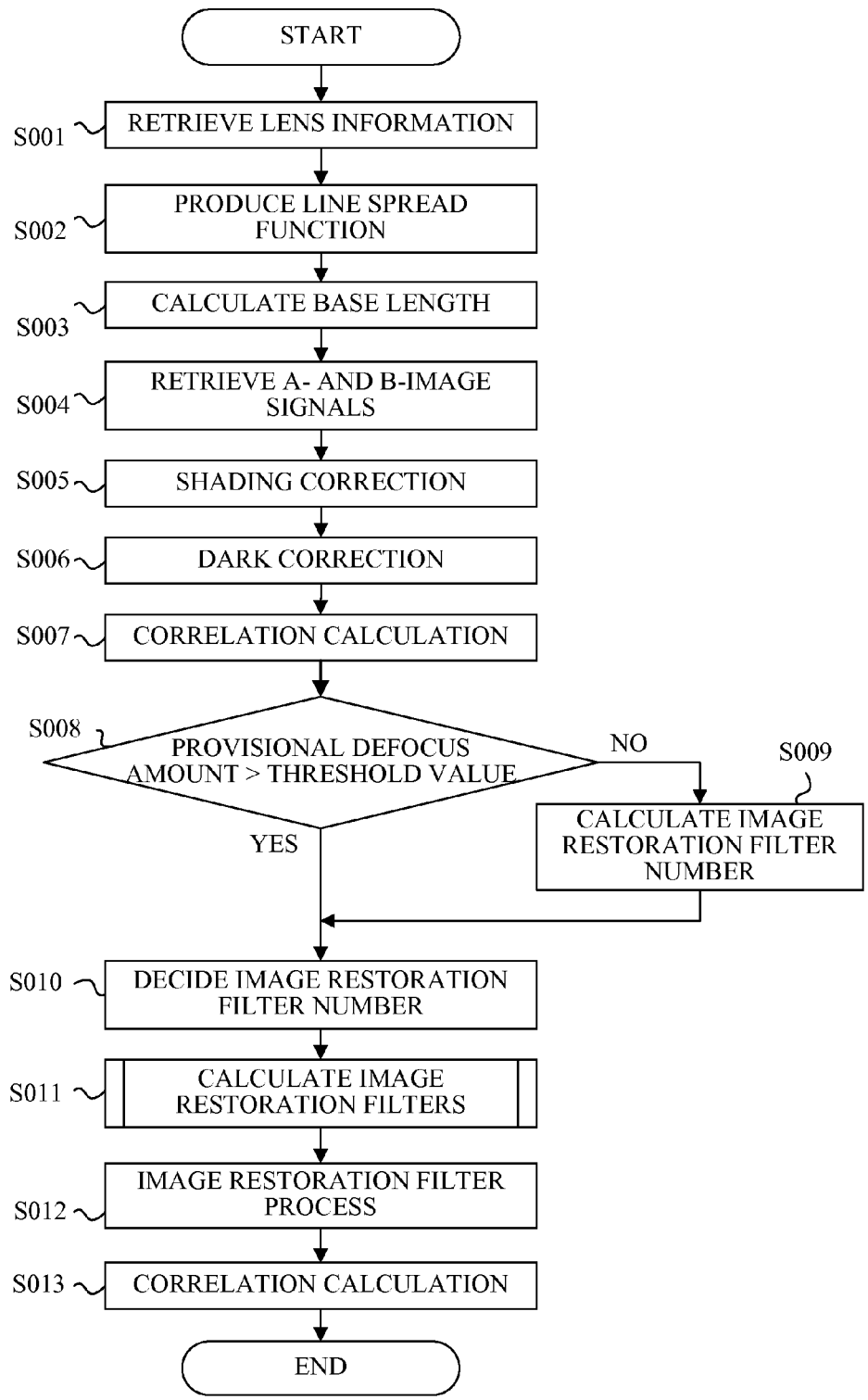
FIG. 10 is a flowchart showing a focus detection process in which a number of image restoration filters is changed according to a defocus amount in Example 1.

Processes from steps S001 to S007 are same as those shown in FIG. 10 in Example 1.

At step S020, the camera CPU 121, which has calculated at step S007 the phase difference between the image signals ImgA and ImgB after the dark correction, determines whether or not the aperture value of the image-taking optical system is larger (or equal to or larger) than a predetermined aperture value (threshold aperture value). If the aperture value is larger (or equal to or larger) than the threshold aperture value, the camera CPU 121 proceeds to step S008, and if the aperture value is smaller than the threshold aperture value, the camera CPU 121 proceeds to step S021. That is, this example changes the image restoration filter number according to the aperture value.

At step S021, the camera CPU 121 calculates a first image restoration filter number according to the aperture value. The first image restoration filter number is a greater plural number than the initial image restoration filter number. Then, the camera CPU 121 proceeds to step S008.

At step S008, the camera CPU 121 determines, as well as at step S008 described in Example 1, whether or not the provisional defocus amount calculated at step S007 is larger (or equal to or larger) than the threshold value. If the provisional defocus amount is larger (or equal to or larger) than the threshold value, the camera CPU 112 sets the image restoration filter number to be equal to the initial image restoration filter number (one or more), and then proceeds to step S010. If the provisional defocus amount is smaller than the threshold value, the camera CPU 112 proceeds to step S022.

At step S022, the camera CPU 121 calculates a second image restoration filter number according to the provisional defocus amount calculated at step S007. The second image restoration filter number is a greater plural number than the initial image restoration filter number. Then, the camera CPU 121 proceeds to step S010.

At step S010, the camera CPU 121 decides the use image restoration filter number. That is, the camera CPU 121 decides one of the first image restoration filter number calculated at step S021, the second image restoration filter calculated at step S022 and the initial image restoration filter number as the use image restoration filter number. In this example, when the camera CPU 121 has calculated both the first and second image restoration filter numbers at steps S021 and S022, the camera CPU 121 selects a greater one of them as the use image restoration filter number.

Thereafter, as steps S011 to S013 described in Example 1, the camera CPU 121 calculates (produces) the image restoration filter(s) whose number is equal to the use image restoration filter number decided at step S010. Furthermore, at step S012, the camera CPU 121 performs the convolution of the image signals ImgA and ImgB with the image restoration filters calculated at step S011, respectively, to produce the same pair number of the restored image signals ReImgA and ReImgB as the use image restoration filter number. Next, at step S013, the camera CPU 121 calculates the phase difference between each of the plural pairs or the one pair of the restored images ReImgA and ReImgB produced at step S012 to calculate the phase difference between each of the plural pairs or the one pair of the restored images ReImgA and ReImgB. Then, the camera CPU 121 selects, out of the phase differences of the plural pairs of the restored image signals ReImgA and ReImgB or the phase difference of the one pair thereof, one phase difference that is determined to be most reliable by the predetermined algorithm. Then, the camera CPU 121 calculates the defocus amount of the image-taking optical system, which is to be used for AF, from the selected phase difference and the base length obtained at step S003. Thus, a series of processes included in the focus detection process is ended.

As described above, this example changes the image restoration filter shape and the image restoration filter number according to the aperture value, thereby enabling production of the image restoration filters appropriate for calculation of the defocus amount, that is, capable of reducing the influence of the aliasing distortion of the image restoration filter even in the near-in-focus state. This enables focus detection with higher accuracy.

While the present invention has been described with reference to exemplary examples, it is to be understood that the invention is not limited to the disclosed exemplary examples. The scope of the following claims is to be accorded the broadest interpretation so as to encompass all such modifications and equivalent structures and functions.

This application claims the benefit of Japanese Patent Application No. 2010-174458, filed on Aug. 3, 2010, which is hereby incorporated by reference herein in its entirety.

INDUSTRIAL APPLICABILITY

The focus detection unit that has excellent focus detection accuracy and the image pickup apparatus comprising this can be provided.

The invention claimed is:

1. A focus detection apparatus comprising:
an image pickup part configured to include (a) first pixels photoelectrically converting a first image formed by a light flux passing through a first pupil area of an image-forming optical system to produce a first image signal and (b) second pixels photoelectrically converting a second image formed by a light flux passing through a second pupil area of the image-forming optical system to produce a second image signal;
a filter generator configured to produce an image restoration filter to be used for a restoration process for the first image signal and the second image signal;
an image restoration processor configured to respectively perform the restoration process on the first image signal and the second image signal by using the image restoration filter to produce a first restored image signal and a second restored image signal; and
a calculating part configured to calculate a defocus amount of the image-forming optical system by using the first and second restored image signals,
wherein the calculating part is configured to calculate a provisional value of the defocus amount by using the first and second image signals, and
wherein, for a case where the provisional value is smaller than a predetermined value,
the filter generator is configured to produce a greater number of the image restoration filters than for a case where the provisional value is greater than the predetermined value,
the image restoration processor is configured to perform the restoration process on the first image signal and the second image signal by respectively using the greater number of the image restoration filters to produce a plurality of the first restored image signals and a plurality of the second restored image signals, and
the calculating part is configured to calculate the defocus amount by using the pluralities of the first and second restored image signals.

2. A focus detection apparatus according to claim 1,
wherein the image-forming optical system includes an aperture stop whose aperture value is variable, and
wherein, for a case where the aperture value is smaller than a predetermined aperture value, the filter generator is configured to produce a greater number of the image restoration filters than for a case where the aperture value is greater than the predetermined aperture value.

3. A image pickup apparatus comprising: a focus detection apparatus according to claim 1 or 2, and an image generator configured to produce an image based on an output signal from the image pickup part.

4. A focus detection method using an image pickup part configured to include (a) first pixels photoelectrically converting a first image formed by a light flux passing through a first pupil area of an image-forming optical system to produce a first image signal and (b) second pixels photoelectrically converting a second image formed by a light flux passing through a second pupil area of the image-forming optical system to produce a second image signal, the method comprising:
a filter generating step of producing an image restoration filter to be used for a restoration process for the first image signal and the second image signal;
an image restoration step of performing the restoration process on the first image signal and the second image signal by respectively using the image restoration filter to produce a first restored image signal and a second restored image signal; and
a calculating step of calculating a defocus amount of the image-forming optical system by using the first and second restored image signals,
wherein, in the calculating step, a provisional value of the defocus amount is calculated by using the first and second image signals, and
wherein, for a case where the provisional value is smaller than a predetermined value,
in the filter generating step, a greater number of the image restoration filters is produced than for a case where the provisional value is greater than the predetermined value,
in the image restoration step, the image restoration process is performed on the first image signal and the second image signal by respectively using the greater number of the image restoration filters to produce a plurality of the first restored image signals and a plurality of the second restored image signals, and in the calculating step, the defocus amount is calculated by using the pluralities of the first and second restored image signals.

\* \* \* \* \*